United States Patent
Kaimi et al.

(10) Patent No.: US 7,040,019 B2
(45) Date of Patent: May 9, 2006

(54) METHOD AND APPARATUS FOR MANUFACTURING HYDRO DYNAMIC BEARING DEVICE

(75) Inventors: Masayuki Kaimi, Kuwana (JP); Kazuto Shimizu, Kuwana (JP); Kimihiko Bitou, Kuwana (JP); Nao Ishiyama, Kuwana (JP); Nobuyoshi Yamashita, Kuwana (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 10/402,321

(22) Filed: Mar. 28, 2003

(65) Prior Publication Data

US 2003/0221317 A1    Dec. 4, 2003

(30) Foreign Application Priority Data

Apr. 3, 2002 (JP) .............................. 2002-101447
Apr. 19, 2002 (JP) .............................. 2002-118259

(51) Int. Cl.
  *B21K 1/10* (2006.01)

(52) U.S. Cl. ................ 29/898.02; 29/705; 29/707; 29/709; 29/407.04; 29/DIG. 44; 33/517; 33/707

(58) Field of Classification Search ............ 29/898.02, 29/DIG. 44, 709, 707, 705, 407.04; 141/1, 141/8, 125; 384/100–128; 184/5, 5.1; 73/290 R, 73/291; 33/517, 707
See application file for complete search history.

(56) References Cited

U.S. PATENT DOCUMENTS

| | | | | |
|---|---|---|---|---|
| 3,536,925 A | * | 10/1970 | Schmidt | 250/564 |
| 3,741,656 A | * | 6/1973 | Shapiro | 356/342 |
| 5,768,784 A | * | 6/1998 | Williams et al. | 29/898.12 |
| 5,894,868 A | * | 4/1999 | Wuester, Sr. | 141/4 |
| 6,370,209 B1 | * | 4/2002 | Zeller et al. | 375/343 |
| 6,733,180 B1 | * | 5/2004 | Nakamura | 384/100 |
| 2004/0107577 A1 | * | 6/2004 | Hayashi et al. | 29/898.02 |
| 2004/0187955 A1 | * | 9/2004 | Misu et al. | 141/8 |

(Continued)

FOREIGN PATENT DOCUMENTS

| JP | 2000-304052 | * 10/2000 |
|---|---|---|
| JP | 2002-005170 | * 1/2002 |

OTHER PUBLICATIONS

JPO Machine Translation of JP 2002-005170.*

*Primary Examiner*—Eric Compton
(74) *Attorney, Agent, or Firm*—J.C. Patents

(57) ABSTRACT

A method and an apparatus for manufacturing a hydro dynamic bearing device is provided for the finishing treatment of lubricating oil after lubricating the hydro dynamic bearing device, specifically for properly and effectively wiping off the lubricating oil adhering to the outside of the housing and adjusting the oil-level height of the lubricating oil filled in the housing. The method for manufacturing the hydro dynamic bearing constructed of an axial member housed in a housing, a radial bearing part for supporting the axial member in a non-contact manner in a radial direction by a hydro dynamic pressure action of the lubricating oil generated in a radial bearing clearance, and a sealing part arranged in an opening part of the housing, has the steps of applying the lubricating oil to an unlubricated hydro dynamic bearing device; and blowing a gas on the outer peripheral surface of the housing, while sucking the lubricating oil from the sealing space of the sealing part or the vicinity thereof using a suction device that generates a negative-pressure suction force.

6 Claims, 9 Drawing Sheets

U.S. PATENT DOCUMENTS

2004/0206577 A1* 10/2004 Bowdoin et al. ............ 184/5.1
2004/0256178 A1* 12/2004 Neumann et al. ............ 184/7.4
2005/0081384 A1* 4/2005 Inoue et al. ............. 29/898.02
2005/0095159 A1* 5/2005 Sumi et al. .................... 418/1

* cited by examiner

METHOD AND APPARATUS FOR MANUFACTURING HYDRO DYNAMIC BEARING DEVICE

BACKGROUND OF THE INVENTION

1. Field of the Invention

The present invention relates to a method and an apparatus for manufacturing a hydro dynamic bearing device. In particular, the present invention relates to a method and an apparatus for manufacturing a hydro dynamic bearing device to be used in a spindle motor equipped in an information technology device such as a magnetic disk device (e.g., HDD or FDD), an optical disk device (e.g., CD-ROM, CD-R/RW, or DVD-ROM/RAM, and an optical magnetic disk device (e.g., MD or MO), a scanner motor equipped in a copying machine, a laser printer (LBP), a barcode reader, or the like, or a small-sized motor equipped in an electrical equipment such as an axial fan.

2. Description of the Related Art

As is generally known in the art, each kind of the motors listed above have been promoted to be provided at lower cost, driven at higher speed and more quiet, and so on in addition to attain a high rotational accuracy. As one of factors that define these required performances, a bearing supporting spindle of the motor has been increasingly valued. In recent years, therefore, as such a kind of the bearing, the use of a hydro dynamic bearing having excellent characteristics that serve a request for the above performance has been studied, and such a hydro dynamic bearing has been developed in a quest to put it to practical use.

For instance, a hydro dynamic bearing device to be built in a spindle motor of a disk device such as a hard disk drive (HDD) comprises a radial bearing part for rotatably retaining an axial member in a non-contacting manner in the radial direction and a thrust bearing part rotatably retaining the axial member in a non-contacting manner in the thrust direction. As a bearing part of each of them, a hydro dynamic bearing device having a groove (a hydro dynamic pressure generating groove) for the generation of hydro dynamic pressure on its bearing surface is used.

In this case, the hydro dynamic pressure generating groove of the radial bearing part is formed in the inner peripheral surface of the bearing member or the housing, or formed in the outer peripheral surface of the axial member. On the other hand, in the case of using an axial member having a flange part, the hydro dynamic pressure generating groove of the thrust bearing part is formed in each of the opposite end faces of the flange part or the surface (e.g., the end face of the bearing member or the bottom surface of the housing) facing to such an end face.

In addition, when an axial member having no flange part is used, there may be adapted a structure that retains the end face of the axial member by a thrust plate attached on the bottom surface of the housing without forming a hydro dynamic pressure generating groove in the bearing surface as a thrust bearing part.

In each of these hydro dynamic bearing devices, furthermore, the axial member is projected outward from the opening part of the housing. For sealing the lubricating oil filled in the housing, a sealing part that covers the periphery of the axial member through a small clearance is provided on the opening part of the housing.

In the final stage of manufacturing such a kind of the hydro dynamic bearing device, a hydro dynamic bearing device is assembled without lubrication and is then dipped in lubricating oil in a vacuum tank, followed by opening the chamber to atmospheric pressure to fill the inner space of the housing with the lubricating oil.

Subsequently, the hydro dynamic bearing device is removed from the vacuum tank after filling with the lubricating oil. In this case, however, a large amount of the lubricating oil adhere to various parts of the removed hydro dynamic bearing device, for example to the outer peripheral surface and the outer bottom surface of the housing, the outer end face of the sealing part, and the outer end face of the axial member.

Then, the lubricating oil adhering to each of these parts is wiped off at a subsequent step. Conventionally, the wiping has been performed using a sheet or film formed of a resin material based on polyethylene, polyvinyl chloride, polyvinylidene chloride, or the like, specifically such as Saran Wrap (trade name) manufactured by Asahi Kasei Corporation.

However, when the lubricating oil is wiped off using the resin film or the like as described above, the wiping is a complicated and very hard work that takes much time to complete, while becoming too burdensome for the worker. Consequently, there is a possibility of decreasing the working efficiency. In this method, furthermore, there is a tendency that it becomes difficult to properly wipe the lubricating oil off from each of the above parts.

That is, the housing of this kind of the hydro dynamic bearing device typically comprises a lateral part having an outer peripheral surface and a bottom part having an outer bottom surface, which are separately provided and fixed together with caulking or the like. Therefore, an uneven spot or a step is found in the joining area between these components. Therefore, when the lubricating oil adhering to the housing is wiped off using the resin film or the like as described above, the uneven spot or the like stands in the way of wiping the lubricating oil to prevent a smooth wiping-off operation. In addition, there is a possibility of remaining the lubricating oil still in a recessed part. As a result, it is concerned about the quality of the product which may decrease.

In addition, on the opening part side of the housing, the axial member is protruded outward by passing through a through hole formed on the center of the sealing part, resulting in that the axial member stands in the way of wiping off the lubricating oil around the axial member using the resin film or the like as described above. Consequently, there is a possibility that it becomes difficult to wipe off the lubricating oil on the outer end face of the sealing part and the outer end face of the axial member, and it is difficult to prevent the lubricating oil being remained in place.

Meanwhile, the wiped hydro dynamic bearing device (or one being subjected to rough wiping) is heated up to an upper limit temperature of the operation to thermally expand the lubricating oil filled in the internal space of the housing, removing an excess amount of the lubricating oil therefrom.

This kind of the treatment brings down the oil level of the lubricating oil at room temperature as much as sufficient to keep it an appropriate level to prevent the lubricating oil from being leaked due to the thermal expansion of the oil when the hydro dynamic bearing drive is operated at an upper limit temperature of the operation. In addition, an excess amount of the lubricating oil being overflowed at this time (i.e., a small amount of the lubricating oil) is also subjected to the wiping-off treatment.

Under present circumstances, the oil level of the lubricating oil in the hydro dynamic bearing device is adjusted such that an increased part of the oil level concurrently with the thermal expansion is absorbed with an oil-absorbing member such as a cotton swab at the time of heating the lubricating oil after the lubricating oil has been filled in the inner space of the housing.

However, the conventional adjustment of oil level is performed using such a naturally-occurring absorbing action, i.e., a capillary phenomena or the like, and in this case, the absorbing performance and the absorbing function of the above action depend on the characteristics of an absorber such as a cotton material, while it is also influenced by the degree of practiced experiences of a worker. Therefore, the management of the oil-level height of the lubricating oil in the housing may be difficult since variations in absorbing volume may occur. When the above variations cause a shortage of the lubricating oil in the housing, several troubles occur, for example insufficient lubrication of the bearing device. Consequently, the hydro dynamic bearing device may deteriorate earlier than expected. In addition, when the amount of the lubricating oil in the housing is excessive, there is a possibility of causing a leakage of the lubricating oil to the outside when the hydro dynamic bearing device is operated at an upper-limit temperature of the operation.

BRIEF SUMMARY OF THE INVENTION

The present invention has been completed in consideration of the above circumstances. It is a technical object of the present invention to provide a method and an apparatus for manufacturing a hydro dynamic bearing device that allows a worker to properly and efficiently perform a finishing treatment for dealing with the lubricating oil after lubricating the hydro dynamic bearing device, more specifically to properly and efficiently wipe the lubricating oil adhering to the outside area of the housing and adjust an oil level height of the lubricating oil being filled in the inside of the housing.

In order to resolve the above technical problem, a first aspect of the present invention is a method (hereinafter also referred to as a first method) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The method includes the step of wiping off the lubricating oil adhering to an outer bottom surface and an outer peripheral surface of the housing by blowing a gas at least on these surfaces after applying the lubricating oil to the housing;

Here, although the "gas" is preferably the atmospheric air, it may be inert gas such as nitrogen or argon, or a mixture thereof.

According to such a configuration of the first method, the lubricating oil adhering at least to the outer bottom surface (the bottom surface exposed to the outside) and the outer peripheral surface of the housing is blown off or streamed with blowing to wipe off the undesired lubricating oil on these surfaces. Therefore, there is no need of difficult and complicated work such as the conventional work of wiping off the lubricating oil using a resin film or the like, resulting in an extensive improvement of the working efficiency. In addition, the lubricating oil, which is being in a state of easily remaining in a recessed or stepped part of the housing, can be easily wiped off by the gas even in the case of: having a recessed part or a stepped part in the joining area between a lateral part having an outer peripheral surface and a bottom part having an outer bottom surface, which are separately provided and then fixed together with caulking or the like to construct the housing; or having a recessed part or a stepped part in the other part of the housing. Consequently, the lubricating oil can be properly removed at least from the outer bottom surface and the outer peripheral surface of the housing, so that a high-quality hydro dynamic bearing device can be obtained.

In order to resolve the above technical problem, a second aspect of the present invention is an apparatus (hereinafter also referred to as a first apparatus) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The apparatus includes wiping-off means for wiping off the lubricating oil adhering at least to an outer bottom surface and an outer peripheral surface of the housing after applying the lubricating oil to the housing, wherein the wiping-off means is constructed of gas-blowing means for blowing a gas on each of the surfaces.

According to such a configuration of the first apparatus, the lubricating oil adhering at least to the outer bottom surface (the bottom surface exposed to the outside) and the outer peripheral surface of the housing is blown off or streamed with blowing to wipe off the undesired lubricating oil on these surfaces. Therefore, the same effects as that of the first method of the present invention can be attained.

In this case, preferably, a gas-flowing passage may be formed such that the gas from the single gas-blowing means flows along the outer bottom surface and the outer peripheral surface of the housing. Consequently, only by providing single gas-blowing means, the lubricating oil adhering to the above both surfaces of the housing can be wiped off all at once by the gas even though the outer bottom surface and the outer peripheral surface of the housing are arranged perpendicular to or almost perpendicular to each other. Therefore, the configuration of the apparatus described above can reduce the number of structural parts of the device to be used for the wiping-off operation, can achieve the miniaturization of the device, and also reduce the cost of the device, while contributing a reduction in the manufacturing costs.

In addition, it is preferable that the hydro dynamic bearing device is held such that the sealing part is located downward, and an area extending from the outer end face of the sealing part to the axial member is shielded from the gas-flowing passage. Consequently, the lubricating oil can be effectively wiped off by, for example, blowing the gas downward to stream the lubricating oil under its own weight from the outer bottom surface to the outer peripheral surface of the housing. In addition, the area extending from the outer end face of the sealing part (the end face of the sealing part exposed to the outside) to the axial member is shielded from the gas-flowing passage. Therefore, as described above, even though the lubricating oil flows downward along the outer peripheral surface of the housing, there is no possibility of causing trouble in which the lubricating oil flows and adheres to the outer end face of the sealing part or to the axial member, or the lubricating oil flows into a sealing space between the sealing part and the axial member.

In order to resolve the above technical problem, a third aspect of the present invention is a method (hereinafter also referred to as a second method) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The method includes the step of wiping off the lubricating oil adhering to an outer end face of the sealing part and an outer end face of the axial member by acting a negative-pressure suction force by suction means at least on the outer end faces after applying the lubricating oil to the housing.

According to the configuration of the second method, the lubricating oil adhering at least to the outer end face of the sealing part and the outer end face of the axial member (the end face of the axial member exposed to the out side) is sucked by the suction means under a negative pressure to wipe off the undesired lubricating oil on these outer end faces. There is no need of difficult and complicated work of wiping off the lubricating oil using a resin film or the like. Thus, it becomes possible to improve the working efficiency to a large extent. Furthermore, even though the axial member protrudes from the sealing part outside, the procedure based on negative-pressure suction substantially prevent the axial member from standing in the way of wiping off the lubricating oil. Therefore, the wiping can be performed appropriately without improperly remaining the undesired lubricating oil on a part where it is difficult to wipe the lubricating oil due to the presence of the axial member.

In order to resolve the above problem, a fourth aspect of the present invention is an apparatus (hereinafter also referred to as a second apparatus) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The apparatus includes wiping-off means for wiping off the lubricating oil adhering at least to an outer end face of the sealing part and an outer end face of the axial member after applying the lubricating oil to the housing, wherein the wiping-off means is constructed of suction means for making a negative-pressure suction force act on these outer end faces.

According to the configuration of the second apparatus as described above, the lubricating oil adhering at least to the outer end face of the sealing part and the outer end face of the axial member (the end face of the axial member exposed to the outside) is sucked by suction means under a negative pressure to wipe off the undesired lubricating oil on these outer end faces. Therefore, the same effects as those of the second method of the present invention can be obtained.

In this case, preferably, the suction means may include two suction nozzles, one used for the outer end face of the sealing part and the other used for the outer end face of the axial member. Consequently, the amount of the lubricating oil being sucked can be stably adjusted and also easily managed by managing the nozzle diameter, nozzle-tip position, and sucking force of each suction nozzle. Furthermore, the nozzle tip can be easily arranged on a part where it is difficult to wipe off the lubricating oil due to the presence of the axial member. Therefore, the wiping-off operation can be more appropriately performed.

Furthermore, preferably, the lubricating oil may be sucked and wiped off by the suction means while rotating the hydro dynamic bearing device about the axial center by the rotation jig. Consequently, the entire perimeter of each of the outer end face of the sealing part and the outer end face of the axial member can be subjected to the wiping-off action only by holding the suction means on a fixed position or a simple reciprocating motion such as a swing motion of the suction means, contributing a simplification of the mechanism for moving the suction means and also contributing a simplification of the device required for the wiping-off operation and a cost reduction in providing such a device.

Furthermore, to resolve the above technical problem, the following method may be applied instead of the methods described above.

That is, after applying the lubricating oil to the housing, a rotational force about the axial center is given to the hydro dynamic bearing device, and at the same time the oil-absorbing member is made contact with each of the outer end face of the sealing part and the outer end face of the axial member to wipe off the lubricating oil adhering to these outer end faces.

In this case, it may be constructed such that the hydro dynamic bearing device is intermittently rotated about the axial center to make the -above-oil-absorbing member contact with each of the above outer end faces at the time of suspending the rotary motion.

Alternatively, it may be constructed such that a continuous rotary motion about the axial center is given to the above hydro dynamic bearing device while stopping the rotation of the hydro dynamic bearing device by an abutting force of the oil-absorbing member against each of the above outer end faces.

In order to resolve the above technical problem, a fifth aspect of the present invention is a method (hereinafter also referred to as a third method) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The method includes the step of: sucking the lubricating oil from a sealing space of the sealing part or a vicinity thereof by suction means for generating a negative-pressure suction force to adjust an oil-level height of the lubricating oil in the housing.

According to such a configuration of the third method, the amount of the lubricating oil after lubricating the hydro dynamic bearing device is adjusted by the suction means that generates a suction force under a negative pressure. Therefore, the control of the suction force and also the control of the suction oil amount can be performed stably, compared with the conventional method that uses a naturally-absorbing action with a cotton swab or the like. Consequently, it becomes possible to precisely and easily manage the oil-level height and amount of the lubricating oil, so that problems of early deterioration of the bearing device due to a leakage of the lubricating oil to the outside and poor lubrication at the time of driving the hydro dynamic bearing device at an upper limit temperature of the operation can be effectively avoided.

The oil-level height may be measured by means of a laser after sucking the lubricating oil at the time of adjusting the amount of oil as described above. Consequently, a high-quality hydro dynamic bearing device can be provided in the market since the selection between the good product and the defective product can be performed by confirming whether the suction oil amount of the lubricating oil by the suction means is correct using a laser.

In order to resolve the above technical problem, a sixth aspect of the present invention is to provide an apparatus (hereinafter also referred to as a third apparatus) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The apparatus includes suction means for sucking the lubricating oil from a sealing space of the sealing part or a vicinity thereof under a negative pressure to adjust an oil-level height of the lubricating oil in the housing.

According to such a configuration of the third method, the adjustment of the amount of the lubricating oil after lubricating the hydro dynamic bearing device is performed by the suction means that sucks the lubricating oil under a negative pressure. Therefore, just as with the manufacturing method described above, it becomes possible to precisely and easily manage the oil-level height and the amount of the lubricating oil. Problems of early deterioration of the bearing device due to a leakage of the lubricating oil to the outside and badness of lubrication at the time of driving the hydro dynamic bearing device at an upper limit temperature of the operation can be effectively avoided.

In this case, preferably, the suction means may include a suction nozzle. The nozzle diameter, nozzle-tip position, suction force, and suction time of the suction nozzle can be managed to adjust the oil-level height in a stable manner and to manage such an adjustment in a simple manner. Therefore, the advantages of the manufacturing apparatus described above can be attained more easily.

Furthermore, the suction means may be capable of being close to or being away from the sealing space in a relative manner. Consequently, it becomes possible to place the suction means (the suction portion thereof) on the sealing space or the vicinity thereof when the amount of lubricating oil in the housing should be adjusted. Also it is possible to relatively displace the suction means away from the sealing space to its retracting position when the adjustment of the amount of oil is completed. Consequently, for example, it becomes possible to make the fabrication procedure automatic and also to speedup the procedure when the hydro dynamic bearing device is produced on an assembly line.

Furthermore, preferably, a rotation jig for rotating the hydro dynamic bearing device about an axial center may be equipped in the apparatus for manufacturing the hydro dynamic bearing device. According to such a configuration of the apparatus, it becomes possible to suck and wipe off the lubricating oil by the suction means while rotating the hydro dynamic bearing device about the axial center by the rotation jig. As the suction means is allowed to suck the lubricating oil directly over the entire perimeter of the sealing space, the amount of the lubricating oil can be adjusted more precisely and uniformly.

In the manufacturing apparatus having the structural components described above, it is preferable to equip a laser for measuring the oil-level height of the lubricating oil after sucking the oil. In this case, furthermore, similarly to the manufacturing method described above, a high-quality hydro dynamic bearing device can be provided in the market since the selection between the good product and the defective product can be performed by confirming whether the suction oil amount of the lubricating oil by the suction means is correct using a laser.

In order to resolve the above-mentioned technical problem, a seventh aspect of the present invention is to provide a method (hereinafter also referred to as a fourth method) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The method includes the step of measuring an oil-level height of the lubricating oil in the housing by a laser.

According to such a configuration of the fourth method, after lubricating the hydro dynamic bearing device during the manufacturing process, whether the amount of the lubricating oil filled in the housing is proper or not, that is, whether the oil amount is properly adjusted or not can be confirmed by means of a laser (laser beam). Thereby, it is possible to detect whether the oil amount is insufficient or excess with accuracy. Further, it contributes to automation of the oil-level height detection.

As a concrete example, a laser displacement meter as laser displacement determining means is arranged at a position a predetermined distance away from the sealing part of the housing. A distance from a standard position of the laser displacement meter to the sealing part and a distance from the standard position of the laser displacement meter to the oil-level height are detected. Based on a comparison result between two detected distances, the oil-level height of the lubricating oil in the housing is detected. Then, based on the detected oil-level height, whether the amount of the lubricating oil in the housing is proper or not is judged.

In this case, it is preferred to detect the two distances in directions parallel to each other. Namely, the irradiation direction of the laser beams is parallel to another. In order to do so, the laser displacement meter is preferably configured to detect the two distances at two positions by moving the meter in a direction perpendicular to the axial center of the hydro dynamic bearing device. Alternatively, two laser displacement meters are arranged at two locations along the direction perpendicular to the axial center of the hydro dynamic bearing device. In a preferred embodiment, the two distances are detected along the direction parallel to the axial center of the hydro dynamic bearing device. In other words, the irradiation direction of the laser beam is parallel to the axial center of the hydro dynamic bearing device. At least one position in the circumferential direction is enough for the meter to detect the two distances, although two or more positions, for example, two positions separated by 180 degrees are preferred.

In order to resolve the above-mentioned technical problem, an eighth aspect of the present invention is to provide an apparatus (hereinafter also referred as a fourth apparatus) for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing. The apparatus includes a laser for measuring an oil-level height of the lubricating oil in the housing.

According to such a configuration of the present invention, whether the amount of the lubricating oil filled in the housing is proper or not can be confirmed by means of a laser (laser beam). Thereby, it is possible to detect whether the oil amount is insufficient or excess with accuracy. Further, it contributes to automation of the apparatus (in preferred embodiment fully automated apparatus). In this case, also the laser displacement meter as laser displacement means is arranged to perform the same operation as in the previous embodiments.

DETAILED DESCRIPTION OF THE INVENTION

Figure 1:
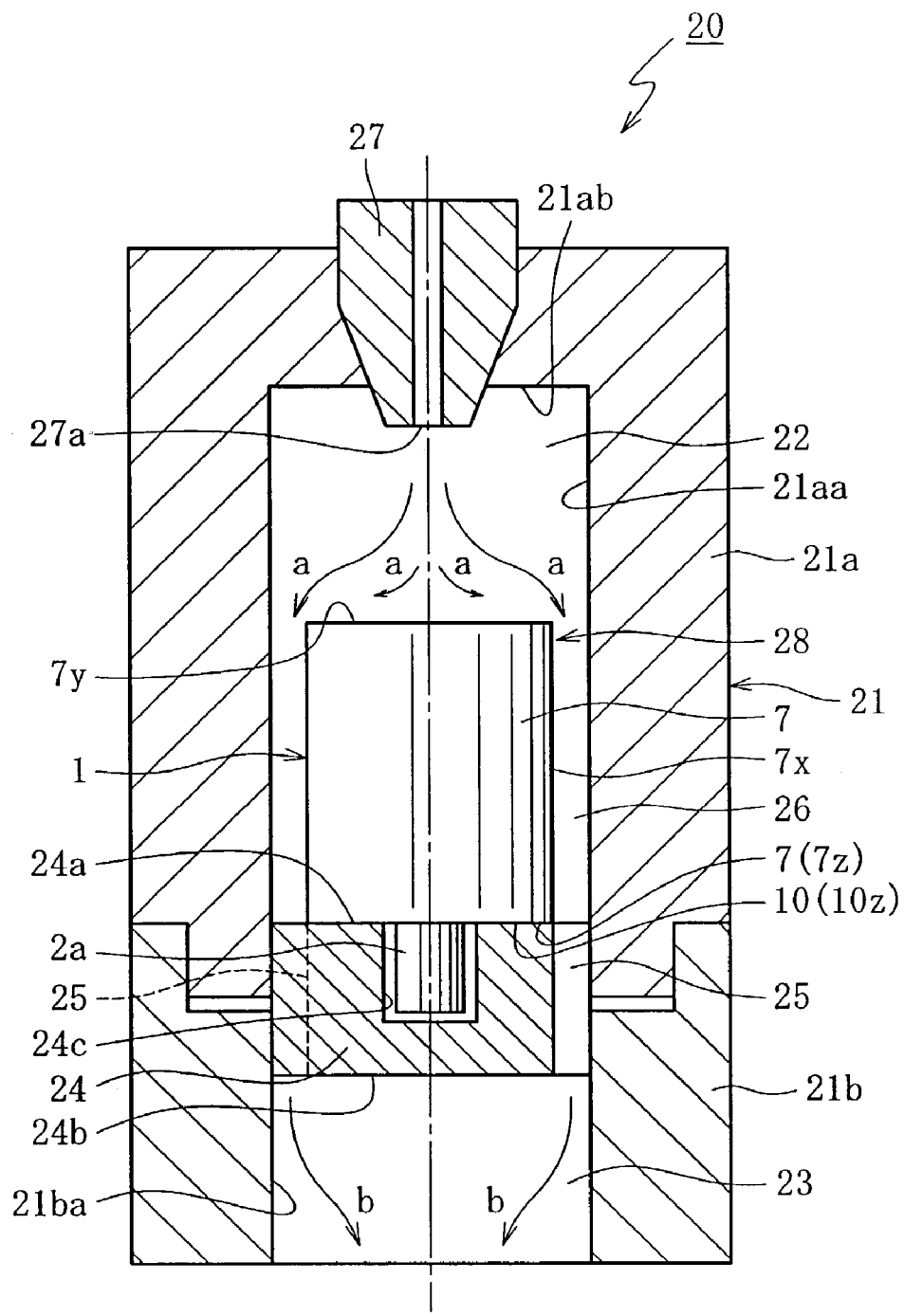
FIG. 1 is a schematic front view showing an apparatus for wiping off lubricating oil for use in a first method for manufacturing a hydro dynamic bearing device in accordance with one of embodiments of the present invention.

Hereinafter, preferred embodiments of the present invention will be described with reference to the accompanying drawings. FIG. 1 is a schematic view of an apparatus for wiping-off lubricating oil as a first manufacturing apparatus for carrying out a first method for manufacturing a hydro dynamic bearing device in accordance with the present invention. FIGS. 2A and 2B are diagrams for illustrating the inner structure of the hydro dynamic bearing device, FIG. 2A being a vertical cross sectional view thereof, and FIG. 2B being an enlarged view of a part marked with the symbol A in FIG. 2A.

For the sake of convenience in description, the configuration of a hydro dynamic bearing device will be described at first in advance to the description of a wiping-off apparatus for carrying out the first manufacturing method.

As shown in FIG. 2A, the hydro dynamic bearing device 1 mainly includes a housing 7 in a bottomed cylindrical shape having an opening part 7a in its one end, a cylindrical bearing sleeve 8 fixed on the inner periphery of the housing 7, an axial member 2 arranged on the inner periphery of the bearing sleeve 8, and a sealing member 10 fixed on the opening part 7a of the housing 7.

The housing 7 is formed of a soft metallic material such as brass (or may be formed of stainless steel, stainless steel pipe, resin material, or the like). The housing 7 includes a cylindrical lateral part 7b and a bottom part 7c. In addition, for example a spiral hydro dynamic pressure generating groove (not shown) may be formed on the region to be provided as a thrust bearing surface of the inner bottom surface 7c1 of the bottom part 7c. In this embodiment, furthermore, the lateral part 7b and the bottom part 7c of the housing 7 are separately-prepared structural components being fixed to each other with appropriate connecting means. For example, a lid-shaped member to serve as the bottom part 7c is caulked in and bonded to the other-end opening part of the lateral part 7b. Alternatively, the lateral part 7b and the bottom part 7c may be provided as an integral structure.

The axial member 2 is formed of a metallic material such as stainless steel or aluminum. The axial member 2 includes an axial part 2a and a flange part 2b. The flange part 2b is integrally or separately mounted on the lower end of the axial part 2a. Furthermore, a hollow 2a1 and a tapered surface 2a2 are formed in the outer peripheral surface of the axial part 2a. The tapered surface 2a2 has a predetermined taper angle to gradually decrease the diameter thereof from the lower end to the upper end thereof (see FIG. 2B), while a cylindrical surface 2a3 of the axial part 2a is formed immediately above the tapered surface 2a2 in a continuous manner.

The bearing member 8 is formed from a porous material or the like, particularly a sintered metal mainly comprising copper. Thus, pores are formed in the bearing member 8, so that these pores can be impregnated with lubricant oil to provide an oil-containing bearing. On the inner peripheral surface 8a of the bearing member 8, upper and lower radial bearing surfaces R1 and R2 are formed. In addition, a spacing part R3 is interposed between the surfaces R1 and R2 to separate these surfaces R1, R2 in the axial direction. Each of the bearing surfaces R1, R2 has a hydro dynamic pressure generating groove with the herringbone shape (not shown). Also, the spacing part R3 faces to the hollow 2a1 of the axial part 2a, and the clearance between the spacing part R3 and the hollow 2a1 is set to be larger than the radial bearing clearance. The bottom surface 8c of the bearing member 8 has an area to be provided as a thrust bearing surface. In such an area, a hydro dynamic pressure generating groove (not shown) in the shape of a spiral or the like is formed.

The sealing member 10 is formed like a ring and is fixed in the inner peripheral surface of the opening part 7a of the housing 7 by means of press-fit and/or adhesive, or the like. In this embodiment, furthermore, the inner peripheral surface 10a of the sealing member 10 is formed like a cylinder and the lower end face 10b of the sealing member 10 abuts on the upper end face 8b of the bearing member 8. The inner peripheral surface 10a of the sealing member 10 faces to the tapered surface 2a2 of the axial part 2a through a predetermined clearance therebetween. Between these components facing to each other, there is formed a sealing space S. This space S is provided as a tapered space gradually expanded in the upward direction of the housing 7.

Next, a description is given of a first wiping-off apparatus (i.e., the first manufacturing apparatus) to be used in the first method for manufacturing a hydro dynamic bearing device having the inner structure described above.

As shown in FIG. 1, the first wiping-off apparatus 20 includes a casing member 21 in which an air-flowing space is formed, and a partition member 24 for dividing the air-flowing space into an air-blowing space 22 located above and an air-vacuuming space 23 located below. The partition member 24 serves as a mounting member on which the hydro dynamic bearing device 1 is mounted. In this embodiment, the casing member 21 includes an upper casing member 21a and a lower casing member 21b which are fit together in a detachable manner such that the mounting member (the partition member) 24 is integrally fixed on the upper end of the lower casing member 21b to provide a combined structure.

The air-blowing space 22 is a space defined by the inner peripheral surface 21aa of the upper casing member 21a, the ceiling surface 21ab of the upper casing member 21a, and the upper surface 24a of the mounting member 24. The air-vacuuming space 23 is a space defined by the inner peripheral surface 21ba of the lower casing member 21b and the lower surface 24b of the mounting member 24. An insert hole 24c is formed in the central part of the mounting member 24. Therefore, an axial part 2a (the axial part 2a protruded outward from the sealing member 10 of the axial member 2) where the sealing member 10 directs downward is inserted into the insert hole 24c with play. In addition, a plurality of through-holes 25 is formed on the outer peripheral side of the mounting member 24. These holes 25 allow the air-blowing space 22 to communicate with the air-vacuuming space 23, respectively.

As shown in the figure, in a state of mounting the hydro dynamic bearing device 1 on the mounting member 24, the outer end face 10x of the sealing member 10 is arranged in close contact with the upper surface 24a of the mounting member 24. In addition, an air-flowing clearance 26 is formed between the outer peripheral surface 7x of the housing 7 and the inner peripheral surface 21aa of the air-blowing space 22. Furthermore, a plurality of through-holes 25 is opened in the upper surface 24a of the mounting member 24 so as to be substantially circumscribed on the outer peripheral side of the outer peripheral surface 7x of the housing 7.

On the upper end part of the casing member 21, a single air-discharging nozzle 27 (air-blowing means) from which the air is discharged downwardly from a discharge port 27a on the tip thereof to the air-blowing space 22 is installed. In addition, vacuum means (not shown) for sucking the air from the air-vacuuming space 23 is equipped on the side below the lower end part of the casing member 21. The air discharged from the air-discharging nozzle 27 passes through the air-flowing passage 28 extending from the outer bottom surface 7y to the outer peripheral surface 7x of the housing 7 of the hydro dynamic bearing device 1 and reaches the air-vacuuming space 23 through the through-holes 25, followed by being sucked downward by the vacuum means. In this embodiment, the outer end face 7z of the housing 7 and the outer end face 10z of the sealing member 10 are arranged in close contact with the upper surface 24a of the mounting member 24, so that the air cannot be introduced into the close-contacting region.

The first apparatus for wiping off the lubricating oil, which is configured as described above, is used as follows in the process of manufacturing the hydro dynamic bearing device 1.

Figure 2:
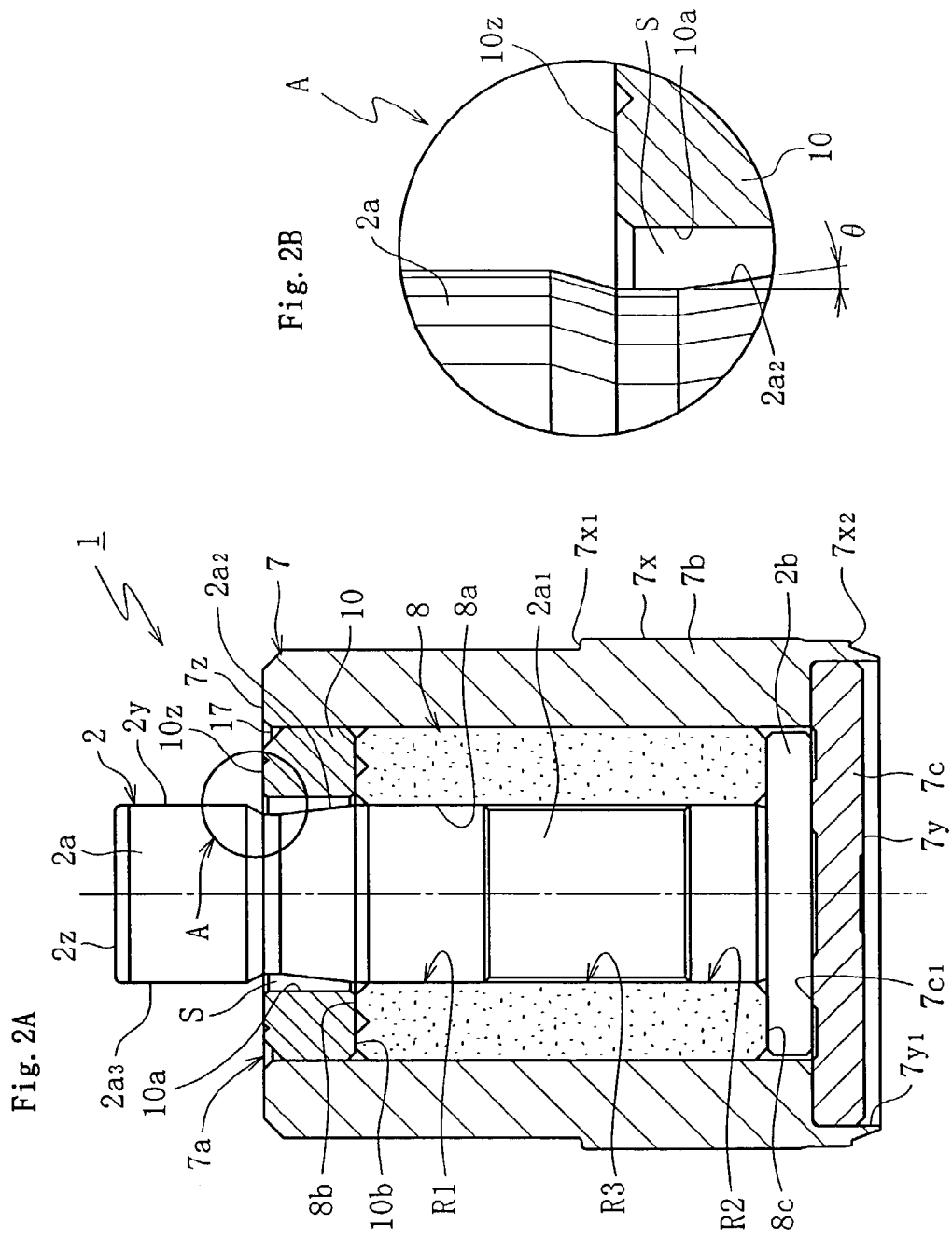
FIG. 2A is a vertical cross sectional front view showing the inner structure of the hydro dynamic bearing device in accordance with one of the embodiments of the present invention.
FIG. 2B is an enlarged vertical cross sectional front view showing a part marked with the letter A in FIG. 2A, respectively.

That is, for lubricating the hydro dynamic bearing device 1 in which each structural component has been assembled in the state as shown in FIG. 2, the hydro dynamic bearing device 1 is assembled at first without lubrication and then the hydro dynamic bearing device 1 is dipped into the lubricating oil in a vacuum tank. Consequently, the air in the inner space of the housing 7 is sucked under vacuum in the vacuum tank and then exhausted. As a result, the inner space of the housing 7 is in a state of being evacuated. After that, the inner space of the housing 7 is opened to the atmospheric pressure to fill the inner space of the housing 7 with the lubricating oil.

When the lubrication is completed as described above, the hydro dynamic bearing device 1 is pulled out of the vacuum tank. In the removed hydro dynamic bearing device 1, a large amount of the lubricating oil adheres to the outer bottom surface 7y and the outer peripheral surface 7x of the housing 7, the outer end face 10z of the sealing member 10, and the outer end face 2z and the outer peripheral surface 2y of the axial part 2a protruded outwardly from the sealing member 10.

In the subsequent wiping-off step, the hydro dynamic bearing device 1 is placed on the mounting member 24 of the wiping-off apparatus 20 as shown in FIG. 1, and then the high-pressure air is discharged downwardly from the air-discharging nozzle 27.

Consequently, the air flow along the outer bottom surface 7y and the outer peripheral surface 7x of the housing 7 is generated.

Specifically, the high-pressure air in the air-blowing space 22 comes into collision with the outer bottom surface 7y of the housing 7 as indicated by the arrow a in FIG. 1 to blow off the lubricating oil adhering to the outer bottom surface 7y, while flowing along the outer peripheral surface 7x of the housing 7 to stream the lubricating oil adhering to the outer peripheral surface 7x with blowing. Consequently, the air passes through the through-holes 25 of the mounting member 24 together with mist of the lubricating oil, reaching the air-vacuuming space 23.

The air including the mist of the lubricating oil reaching the air-vacuuming space 23 is sucked downward by the vacuum means as shown in the arrow b in the figure. Therefore, the air maintains its high flow rate by the synergistic action between the downward discharge pressure caused by the air-discharging nozzle 27 and the downward suction force caused by the vacuum means, while flowing along the outer bottom surface 7y and the outer peripheral surface 7x of the housing 7. Consequently, the lubricating oil adhering to these surfaces 7x, 7y can be wiped off by the air very aggressively.

In this case, as shown in FIG. 2, stepped parts 7x1, 7x2 are formed on the outer peripheral surface 7x of the housing 7, and another stepped part 7y1 is also formed on the outer bottom surface 7y of the housing 7. However, the lubricating oil adhering to these stepped parts 7x1, 7x2, and 7y1, which tends to be remained thereon, is also wiped off by the air flow properly.

Figure 3:
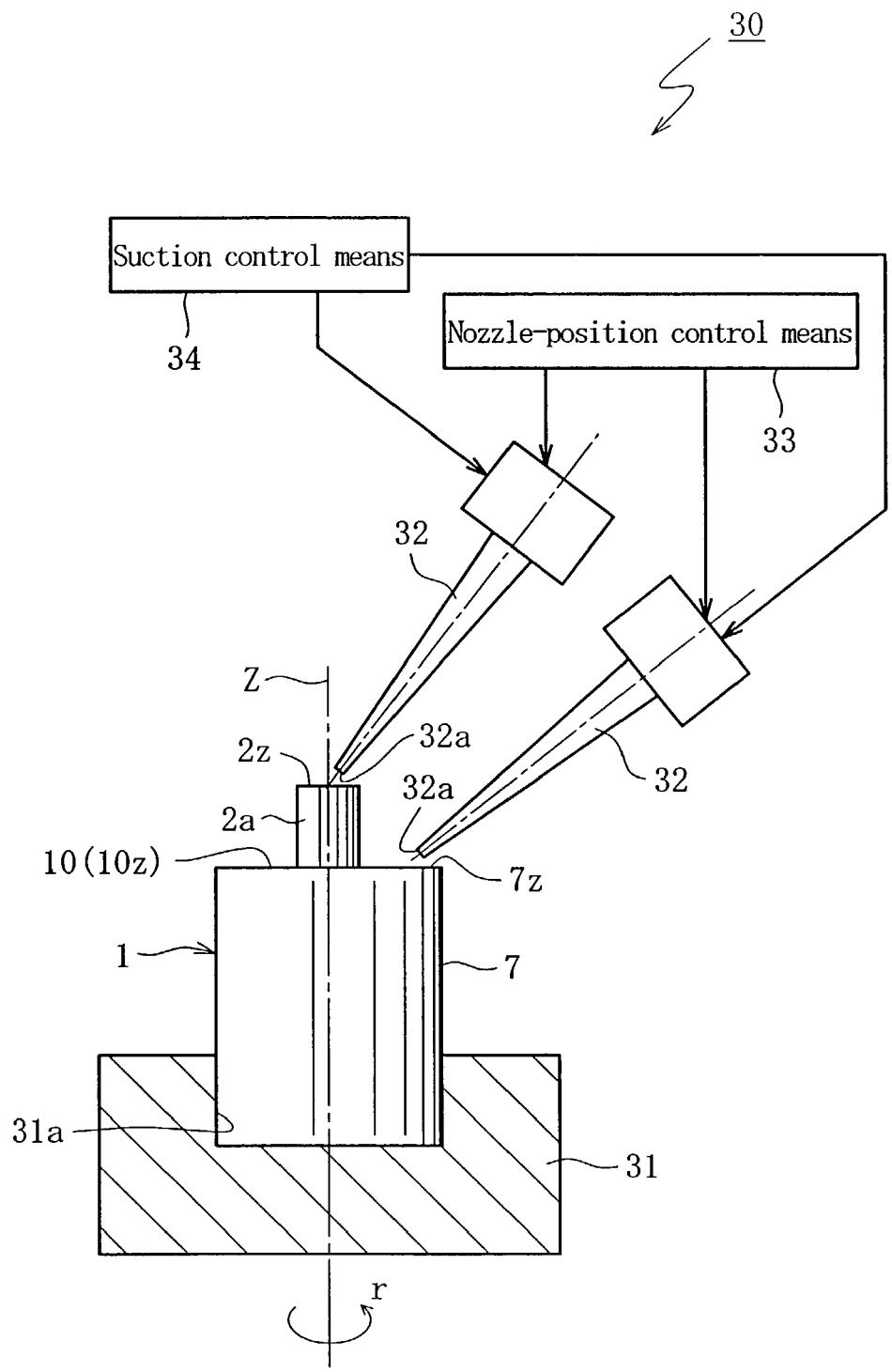
FIG. 3 is a schematic front view showing the configuration of a wiping-off apparatus for use in a second method for manufacturing a hydro dynamic bearing device in accordance with one of the embodiments of the present invention.

Referring now to FIG. 3, there is illustrated a second wiping-off apparatus (i.e., a second manufacturing apparatus) to be used in a second method for manufacturing a hydro dynamic bearing device 1. In other words, the second wiping-off apparatus is used in the subsequent stage of the wiping-off treatment or the prior stage of the treatment to the outer bottom surface 7y and outer peripheral surface 7x of the housing 7 by the first manufacturing apparatus 20 described above.

The second wiping-off apparatus 30 has a rotation jig 31 for supporting the hydro dynamic bearing device 1 from beneath, while the outer end face 10z (the outer end face 2z of the axial part 2a) of the sealing member 10 is directed upward. The rotation jig 31 is constructed so as to rotate about the axial center Z in the direction indicated by the arrow r by the action of a stepping motor or a servo motor (not shown), thereby rotate the hydro dynamic bearing device 1 around the axial center Z. A recessed part 31a formed in the rotation jig 31, in which the lower part of the hydro dynamic bearing device 1 is fit, prevents the inclination of the hydro dynamic bearing device 1 at the time of the rotation.

There are two suction nozzles 32 arranged above the rotation jig 3. These suction nozzles 32 are provided as suction means to make negative-pressure suction forces act on the outer end face 2z of the axial part 2a of the hydro dynamic bearing device 1 in a state of being supported on the rotation jig 31 and the outer end face 10z, 7z which is the portion extending from the sealing member 10 to the housing 7. Each of the two suction nozzles 32,32 are arranged so as to be inclined at a predetermined angle of 30° to 65° with respect to a horizontal plane while each of their nozzle tips 32a, 32a is made abut on or substantially abut on each of the corresponding outer end faces 2z, 10z (7z), preferably via a clearance (e.g., 0.5 mm) between the nozzle and the outer end face 2z, 10z (7z). In addition, the suction nozzles 32 are constructed so as to move in the radial direction (e.g., a reciprocate motion) by the action of nozzle-position control means 33. On the second wiping-off apparatus 30, there is arranged suction control means 34 that controls a negative-pressure suction force generated by each of the two suction nozzles 32. In other words, the suction control means 34 controls the magnitude of the negative-pressure suction force to act on each of the outer end faces 2z, 10z (7z) described above and the generation and termination of negative pressure, and so on.

The second apparatus for wiping off the lubricating oil constructed as described above is used in the process of manufacturing the hydro dynamic bearing device 1 as follows.

That is, the hydro dynamic bearing device 1 having been lubricated with the lubricating oil described above is placed on the rotation jig 31 as shown in FIG. 3 before or after wiping off the lubricating oil on the outer bottom surface 7y and the outer peripheral surface 7x of the housing 7, followed by rotating the rotation jig 31. Thereby, the hydro dynamic bearing device 1 is rotated about the axial center z in the direction of the arrow r.

Under these circumstances, the nozzle tips 32a, 32a of the two suction nozzles 32, 32 are displaced to positions where they are brought into a state of having respective clearances between the nozzle tip 32a and the outer end face 2z of the axial member 2a and between the nozzle tip 32a and the outer end faces 10z, 7z of the sealing member 10 and housing 7. Furthermore, if required, the nozzle tips 32a, 32a of the two suction nozzles 32, 32 are reciprocated in the radial direction. At the same time, the activation of the suction control means 34 generates negative-pressure suction forces in two suction nozzles 32 to suck an excess amount of the lubricating oil adhering to each of the outer end faces 2z, 10z, 7z.

Consequently, an excess amount of the lubrication oil can be wiped off from each of the whole area of the outer end face 2z of the axial part 2, the whole area of the outer end face 10z of the sealing member 10, and the whole area of the outer end face 7z of the housing 7. In this case, as shown in FIG. 2, a recessed part 17 is formed between the outer end face 7z of the housing 7 and the outer end face 10z of the sealing member 10. Even though the lubricating oil adheres to the recessed part 17 and tends to be remained therein, it can be properly wiped off by the negative-pressure suction force of the suction nozzle 32. Furthermore, the lubricating oil can be sufficiently sucked by the negative pressure even though the suction nozzle 32 is held in its fixed position without allowing a reciprocating motion in the radial direction because each of the outer end face 2z of the axial part 2a and the outer end faces 10z, 7z extending from the sealing member 10 to the housing 7 has an extremely small area.

Figure 4:
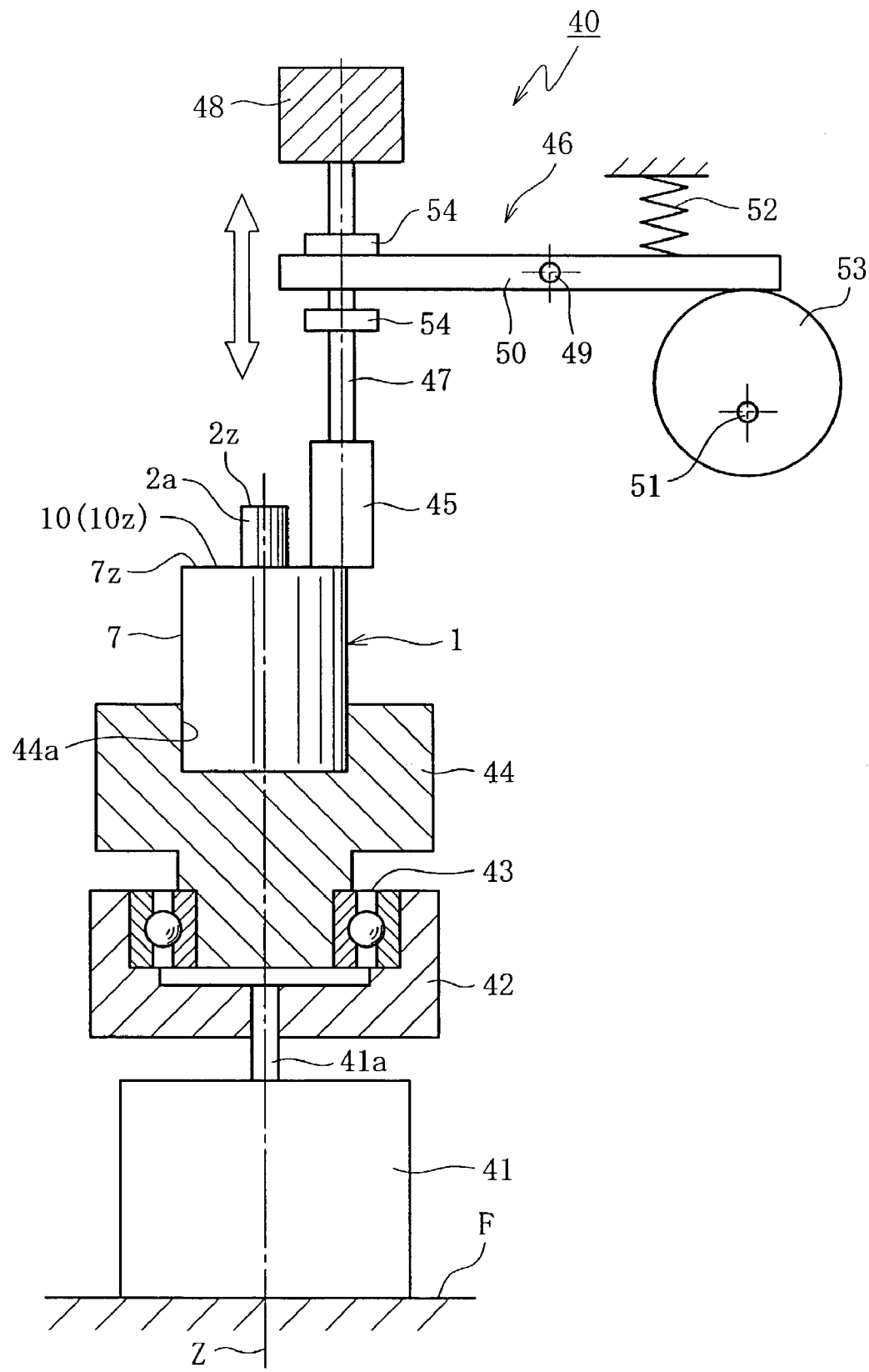
FIG. 4 is a schematic front view showing another example of the configuration of a wiping-off apparatus for use in the second method for manufacturing a hydro dynamic bearing device in accordance with one of the embodiments of the present invention.

In FIG. 4, just as with the above description, there is shown another example of the second wiping-off apparatus (another example of the second manufacturing apparatus) for wiping off the lubricating oil adhering to the outer end face 2z of the axial part 2a and the outer end faces 10z, 7z extending from the sealing member 10 to the housing 7.

The wiping-off apparatus 40 includes: a motor 41 fixed on a base F such that a rotary shaft 41a is in an upright state and is directed upward; a receiving member 42 fixed on the upper end part of the rotary shaft 41a of the motor 41 such that it rotates together with the rotary shaft 41a; and a rotation jig 44 attached above the receiving member 42 through a bearing 43 (e.g., an angular bearing). Furthermore, the lower part of the hydro dynamic bearing device 1 in which the outer end face 10z of the sealing member 10 is directed upward is fixed and held in the recessed part 44a formed on the upper face part of the rotation jig 44.

In addition, a vertical elevating mechanism 46 is arranged above the rotation jig 44. The vertical elevation mechanism 46 is responsible for making the oil-absorbing member 45 abut to or move away from the outer end faces 10z, 7z of the sealing member 10 and the housing 7 of the hydro dynamic bearing device 1 by vertically moving the oil-absorbing member 45 such as a cotton swab. The vertical elevating mechanism 46 includes a weight 48 fixed on the upper part of the oil-absorbing member 45 through a connecting rod 47, an oscillating member 50 supported on an intermediate shaft 49 so as to be able to oscillate about the intermediate shaft 49 to vertically move the oil-absorbing member 45 together with a weight 48, and an eccentric cam 53 for oscillating the oscillating member 50 by cooperating with a spring force of a spring 52. In this case, one end part of the oscillating member 50 is placed between upper and lower collar parts 54, 54 fixed on the middle part in the vertical direction of the connecting rod 47 such that it moves together with the up and down movements of the connecting rod 47. In addition, the other end part of the oscillating member 50 is constructed such that it is constantly kept in contact with the outer peripheral surface of the eccentric cam 53 by a spring force of the spring 52.

The wiping-off apparatus 40 described above wipes off the lubricating oil on the basis of the following action.

That is, the rotary shaft 41a of the motor 41 is constantly rotated. Under such a condition, the eccentric cam 53 and the oscillating member 50 push up the oil-absorbing member 45 together with the weight 48. During this movement, the oil-absorbing member 45 is moved away from the hydro dynamic bearing device 1, so that the rotation jig 44 and the hydro dynamic bearing device 1 can rotate about the axial center Z as the receiving member 42 rotates.

In contrast, the eccentric cam 53 and the oscillating member 50 push down the oil-absorbing member 45 together with the weight 48. When the oil-absorbing member 45 abuts against the outer end face 10z of the sealing member 10 and the outer end face 7z of the housing 7, the bearing 43 runs idle by the force caused by the abutment. Accompanied with such a movement, the rotary motions of the rotation jig 44 and the hydro dynamic bearing device 1 are stopped. At the time of stopping the rotation, the lubricating oil is wiped off from each of the outer end faces 10z, 7z by the oil-absorbing member 45.

After that, the movements of eccentric cam 53 and oscillating member 50 push up the oil-absorbing member 45 again together with the weight 48. In addition, each of the rotation jig 44 and the hydro dynamic bearing device 1 is rotated by a predetermined angle, followed by pushing down the oil-absorbing member 45 together with the weight 48. Consequently, the oil-absorbing member 45 abuts on the outer end faces 10z, 7z of the sealing member 10 and the housing 7 of the hydro dynamic bearing device 1 to stop the rotation of the hydro dynamic bearing device 1 to wipe off the lubricating oil from each of the outer end faces 10z, 7z.

Consequently, the hydro dynamic bearing device 1 intermittently rotates about the axial center Z and the lubrication oil is wiped off by the oil-absorbing member 45 only at the time of stopping the rotation. Therefore, there is no sliding movement occurring between the outer end face 10z of the sealing member 10 and the oil-absorbing member 45, so that an oil-repellent agent applied to the inner periphery side of the sealing member 10 is effectively protected from being removed with friction or the like while the lubricating oil can be efficiently wiped off.

Furthermore, in the step previous to the step of lubrication described above and also previous to assemble the hydro dynamic bearing device 1, an ion-removing washing with ultra pure water is performed on each of the structural components of the hydro dynamic bearing device 1. In this case, it is preferable to control the removing speed of pulling each structural component (hereinafter, also referred as a product to be washed) out of the water to the air. Specifically, the removing speed is defined in the range of 20 mm/s or less, preferably in the range of 10 to 20 mm/s. When the removing speed is 20 mm/s or less, the amount of ions attached on the product to be washed (i.e., the attached amount of water in which ionic ingredients are dissolved) decreases in a preferable manner. When the removing speed is over than 20 mm/s, our experiments revealed that the attached amount of ions on the product to be washed increased in an undesirable manner. When the removing speed is 10 mm/s or less, there is a trouble in which the attached amount of ions does not decrease and the time required for pulling the product to be washed becomes prolonged too much.

In the ion-removing washing with ultra pure water, after pulling the product to be washed out of water to the air, before transferring to a subsequent washing bath or a next step (drying step), it is preferable to shake off the attached water by applying oscillation or impact (shock) to the product to be washed.

Furthermore, when the ion-removing washing with ultra pure water is performed, it is preferable to control the amount of water attached on the product to be washed and the temperature of the product to be washed at the time of conducting the step of drying the water being attached on the product to be washed under vacuum. Specifically, it is preferable to control the amount of water attached on the product to be washed (M) and the temperature of the product to be washed ($T_1$) before drying so as to satisfy the following equation and inequality:

$$n \times m \times \Delta T = MQ$$

$$T_1 - \Delta T > 0$$

where the specific heat of the product to be washed is n (cal/(g·° C.)), the weight of the product to be washed is m(g), the change in temperature is $\Delta T$(° C.), the amount of water being attached is M(g), and the evaporation heat of water is Q (cal/g)·583 (cal/g). Furthermore, preferably, the above product to be washed may be made of copper alloy and also it may be a structural component of the hydro dynamic bearing device for use in an HDD spindle motor.

Consequently, an efficiency of the washing can be increased by controlling the rate of pulling the product to be washed so as to attain a decrease in the amount of water being attached on the product to be washed. In addition, the drying time can be shortened by controlling the temperature of the product to be washed at the time of vacuum drying. As a result, an advantage of improving the working efficiency can be attained.

Figure 5:
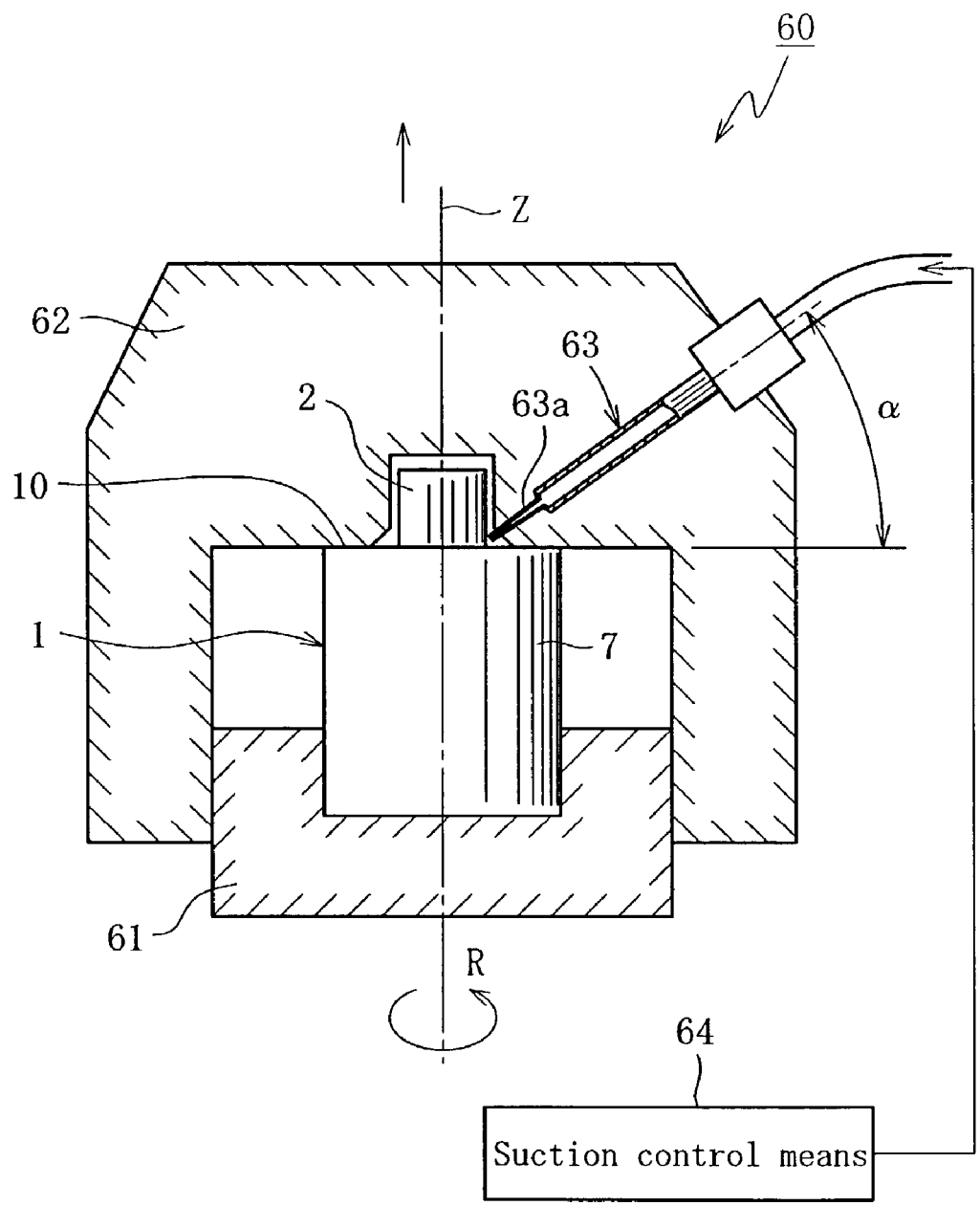
FIG. 5 is a schematic front view showing the configuration of an oil level controller for use in a third method for manufacturing a hydro dynamic bearing device in accordance with one of the embodiments of the present invention.

FIG. 5 is a schematic diagram for illustrating an oil level controller (a third manufacturing apparatus) to be used in a third method for manufacturing a hydro dynamic bearing device as an embodiment of the present invention. The third manufacturing device 60, i.e., the manufacturing apparatus 60 used for adjusting the amount of oil in the hydro dynamic bearing device 1, includes: a rotation jig 61 that supports the bottom part of the lubricated hydro dynamic bearing device 1 from beneath and is capable of rotating about the axial center (in the direction indicated by the arrow R or the opposite direction as shown in FIG. 5); and an elevating jig 62 arranged on the upper side of the hydro dynamic bearing device 1 and capable of moving up and down. In this case, the elevating jig 62 may be kept in place while the rotation jig 61 may be capable of moving up and down.

The elevating jig 62 is capable of moving close to and moving away from the upper end face of the housing 7 (the upper surface of the sealing member 10 described below) of the hydro dynamic bearing device 1. In addition, on the elevating jig 62, there is provided a suction nozzle 63 as suction means where the axial center thereof is inclined at an angle □ of 45° to 65° (preferably, at an angle of 55°) with respect to the horizontal plane. Furthermore, the nozzle tip 63a of the suction nozzle 63 is located between the axial member 2 and the sealing member 10 to control the magnitude and the generation time period of the negative-pressure suction force generated in the suction nozzle 63 by the action of suction control means 64.

Figure 6:
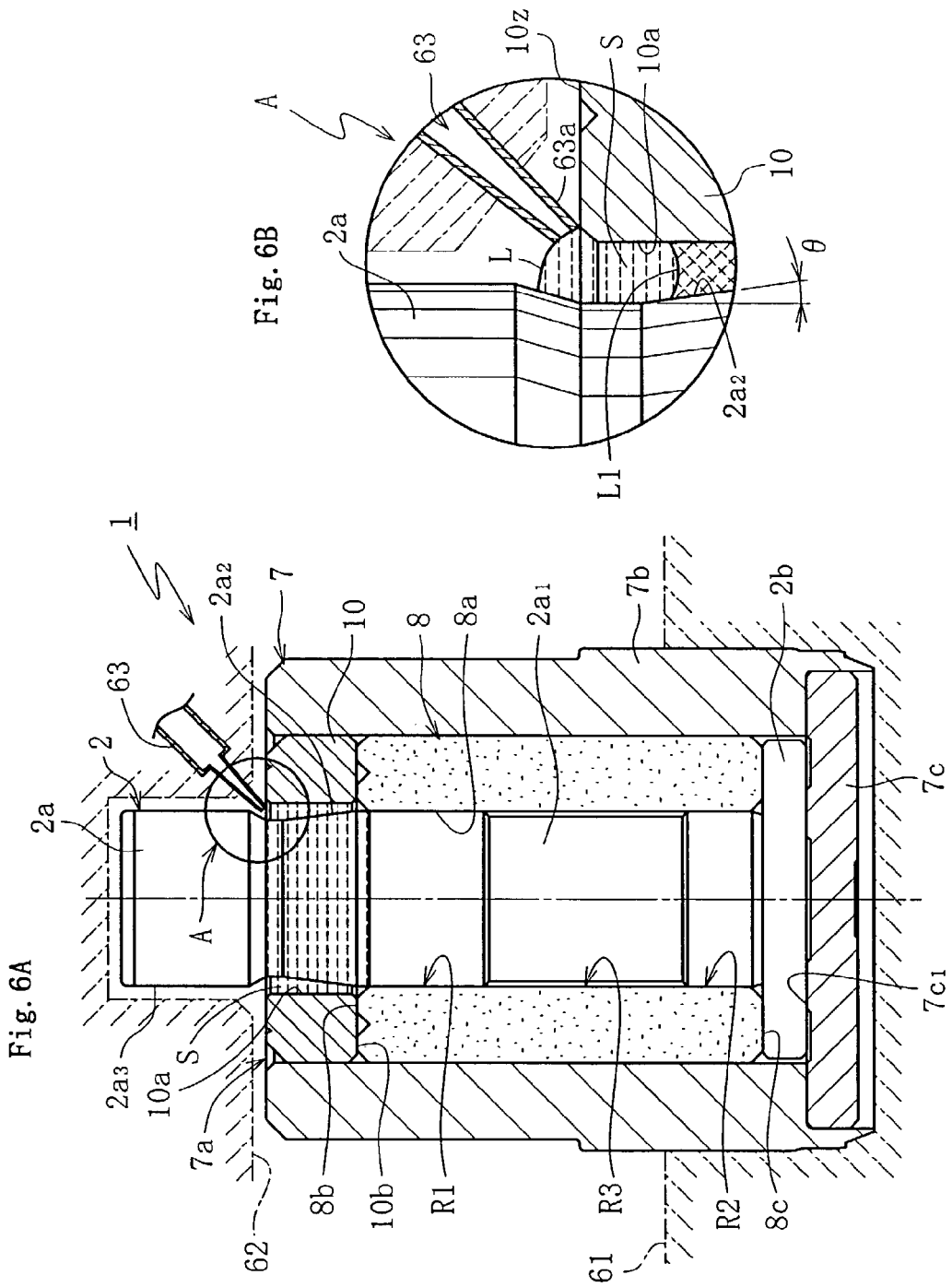
FIG. 6A is a vertical cross-sectional front view showing the configuration of the hydro dynamic bearing device where the third method for manufacturing a hydro dynamic bearing device in accordance with the invention is performed.
FIG. 6B is a partially enlarged vertical cross-sectional front view showing a part marked with the letter A in FIG. 6A, respectively.

FIGS. 6A and 6B are a view showing the inner structure of the hydro dynamic bearing device 1 and a view showing the state of arranging the suction nozzle 63 with respect to the internal structure of the hydro dynamic bearing device 1, respectively. The details of the hydro dynamic bearing device 1 are similar to those shown in FIGS. 2A and 2B referenced in the first and second manufacturing methods described above. Therefore, the explanations of common structural components will be omitted while denoted by the same reference numerals.

In this embodiment, when applying the lubricating oil to the housing 7 of the hydro dynamic bearing device 1, just as with the case described above, the hydro dynamic bearing device 1 is assembled at first without lubrication and then the hydro dynamic bearing device 1 is dipped into the lubricating oil in a vacuum tank, followed by releasing to the atmospheric pressure to fill the inner space of the housing 7 with the lubricating oil.

When the lubrication is completed as described above, the hydro dynamic bearing device 1 is pulled out of the vacuum tank. Then, the wiping-off step according to the first and second manufacturing methods described above is conducted properly if required. Subsequently, as shown in FIG.

5, the hydro dynamic bearing device 1 is heated up to an upper limit temperature of the operation in a state where the lower part of the housing 7 is held with the rotation jig 61, or the hydro dynamic bearing device 1 is heated up to an upper limit temperature of the operation and is then held with the rotation jig 61.

With this heating, the thermal expansion of lubricating oil filled in the inner space of the housing 7 increase the oil-level L of the lubricating oil, for example as shown in FIG. 6B. At this time, the elevating jig 62 is located at the lower moving end or thereabout, or in a state of being moved down. That is, the nozzle tip 63a of the suction nozzle 63 is located between the sealing member 10 and the axial member 2, more specifically located near the upper end of the sealing space S. If required, the positional control is performed by moving the suction nozzle 63 from the state shown in the figure downward by the action of the suction control means 64 or the action of means for driving the elevation of the elevating jig 62. In addition, it may be constructed such that the suction nozzle 63 can be precisely positioned at the time when the lower end face of the elevating jig 62 is made abut on the upper end face of the sealing member 10. Furthermore, in a state where the position of the nozzle tip 63a is being set to a previously defined height, the rotation jig 61 is rotated in the direction indicated by the arrow R, thereby rotate the hydro dynamic bearing device 1 about the axial center Z (see FIG. 5).

In the same time period, the action of the suction control means 64 allows the nozzle tip 63a of the suction nozzle 63 to suck the lubricating oil for a predetermined time under a predetermined pressure. Therefore, an excess amount of the lubricating oil is exhausted outside through the suction nozzle 63 at the upper limit temperature of the operation, resulting in an appropriate oil-level height in the sealing space S. Subsequently, the heating is terminated and the temperature of the hydro dynamic bearing device 1 is then returned to a room temperature. Then, the oil-level height of the lubricating oil in the sealing space S decreases a predetermined level as the temperature decreases and finally settles down to an ideal height, oil-level L1, shown in FIG. 6B.

When the suction force (negative pressure value), suction time, and the position of the nozzle tip 63a of the suction nozzle 63 are properly changed, an excess amount of the lubricating oil can be sucked from the sealing space S at room temperature to keep the oil-level L1 at an ideal height, oil-level L1, without heating the hydro dynamic bearing device 1 as described above. In addition, at the time of sucking the lubricating oil with the suction nozzle 63, there is no need to rotate the hydro dynamic bearing device 1. Therefore, for the hydro dynamic bearing device 1 being fixed and held in the fixed position, an excess amount of the lubricating oil may be sucked with the suction nozzle 63 just as with the above description from one part of the sealing space S.

Figure 7:
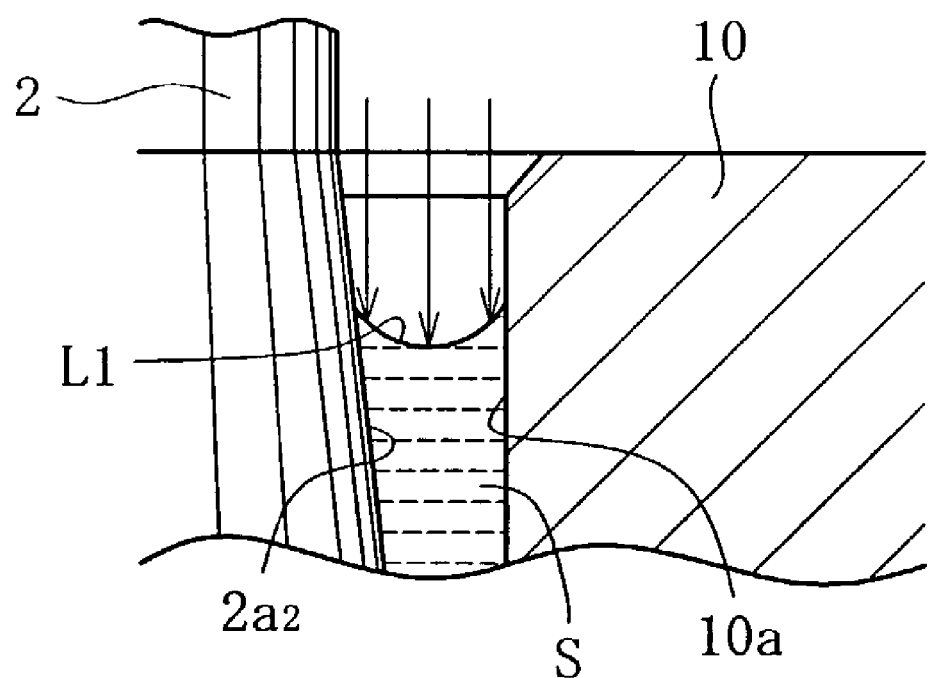
FIG. 7 is a partially enlarged vertical cross-sectional front view showing the hydro dynamic bearing device where a fourth method for manufacturing a hydro dynamic bearing device in accordance with one of the embodiments of the present invention is performed.

After that, the oil-level height is detected using a laser displacement meter. However, as shown in FIG. 7, the oil-level L1 is shaped like a concave-curved surface, so that the position of irradiating the laser is sifted in the radial direction as indicated by the arrows in the figure, the height of the oil-level L1 to be detected is also differed. Therefore, when the axial member 2 is eccentric or the like, the laser is hardly irradiated on the position of the oil-level L1 to be detected. Thus, in this embodiment, it is constructed such that the position of a laser irradiation part is finely adjusted using a micrometer head. Consequently, by precisely detecting the height of the oil-level L1, it becomes possible to select the good product and the defective product with respect to the hydro dynamic bearing device 1 with high accuracy.

Figure 8:
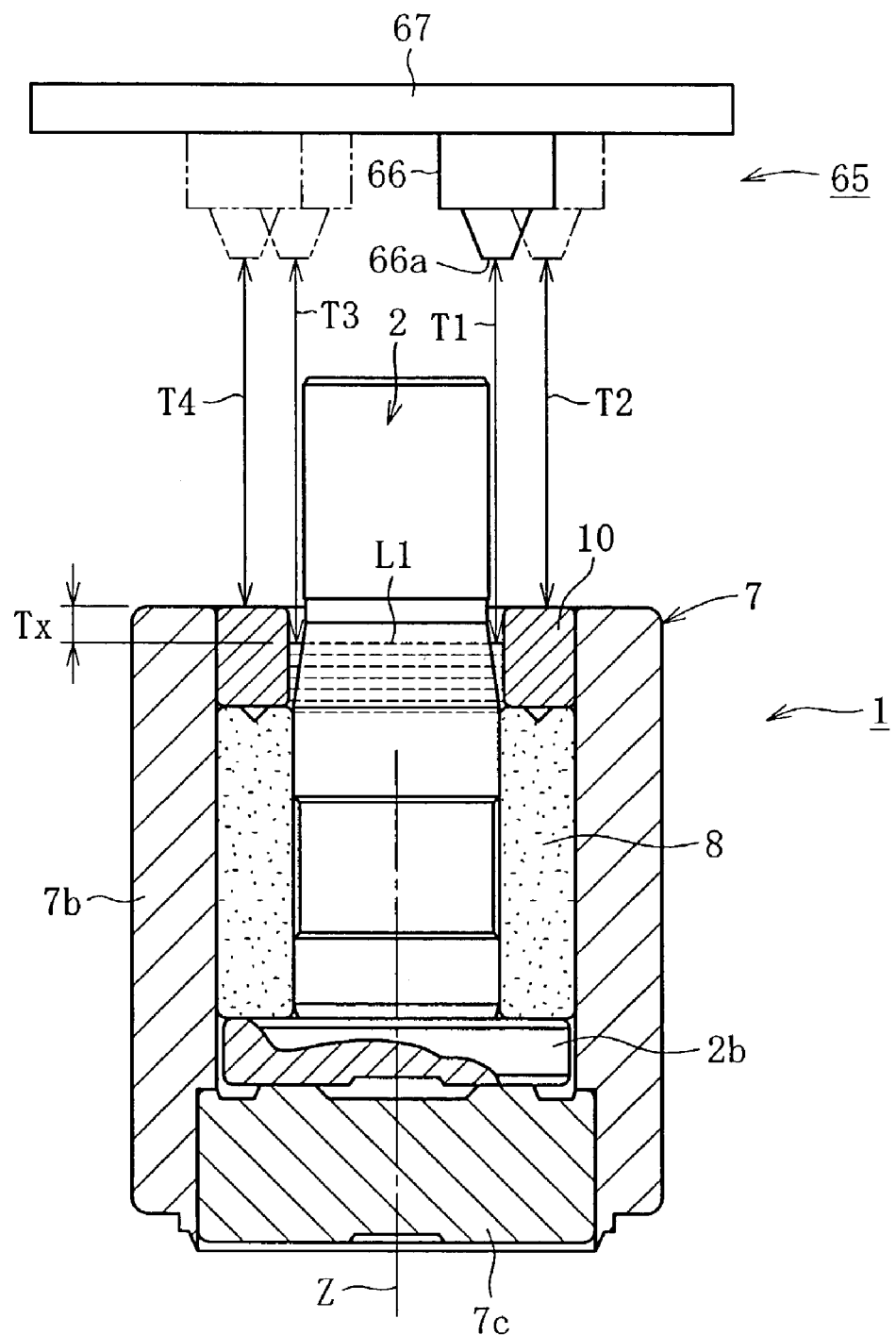
FIG. 8 is a schematic front view showing the oil-level height detector for use in the fourth method for manufacturing the hydro dynamic bearing device according to one embodiment of the present invention.

FIG. 8 shows an oil-level height detector 65 for detecting an oil-level height of lubricating oil filled in the housing 7 using laser beams. As shown in the figure, the oil-level height detector 65 includes a laser displacement meter 66 as laser displacement determining means. The laser displacement meter 66 is arranged above the hydro dynamic bearing device 1 at a position a predetermined distance away from the upper end surface of the sealing member 10 (the upper end surface of the housing 7). The laser displacement meter 66 can vertically emit laser beams downward (in a direction parallel to the axial center Z). In this embodiment, the single laser displacement meter 66 is attached to the lower surface of a sliding table (X table) 67 composed of an X table which can move only along one straight line within a horizontal plane (a plane to which the axial center Z is perpendicular).

The oil-level height of the lubricating oil can be determined by the oil-level height detector 65 in the following manner. First, the laser displacement meter 66 at a first measuring position illustrated in solid line irradiates the oil surface L1 of the lubricating oil with laser beams. At this time, a time period from emission of laser beams to receiving of laser beams reflected by the oil surface L1 is determined and converted into a distance T1 from the standard position 66a of the laser displacement meter 66 (laser irradiation part) to the oil surface L1. Next, the laser displacement meter 66 is moved by the sliding table 67 horizontally, thereby positioning the meter 66 at the next nearest position illustrated in broken line. Then, the laser displacement meter 66 irradiates the upper end surface of the sealing member 10 with laser beams. At this time, a time period from emission of laser beams to receiving of laser beams reflected by the upper end surface of the sealing member 10 is determined and converted into a distance T2 from the standard position 66a of the laser displacement meter 66 to the upper endsurface of the sealing member 10. Then, based on the difference between the two distances T1 and T2, an oil-level height (T1–T2) of the lubricating oil at the first position can be determined.

The laser displacement meter 66 is moved to a second measuring position separated by 180 degrees from the first position by the sliding table 67. The same determining process is carried out there to determine an oil-level height (T3–T4) of the lubricating oil at the second position. Then, an average of the oil-level height (T1–T2) at the first position and the oil-level height (T3–T4) at the second position is assigned to an oil-level height Tx of the hydro dynamic bearing device 1 (an oil-level height on the basis of the upper end surface of the sealing member 10). Based on the oil-level height Tx, whether the amount of the lubricating oil filled in the housing 7 is proper or not is judged to judge whether the hydro dynamic bearing device 1 of interest is a good product or not. If it is judged as a defective product, lubricating process or oil amount adjustment process is performed again, before the oil-level height Tx is determined again using the laser displacement meter 66 in the same manner as described above.

By determining an oil-level height in the hydro dynamic bearing device 1 using the laser displacement meter 66, it is possible to confirm whether the oil amount is proper or not with accuracy. This helps the proper hydro dynamic pressure action and lubrication action of the hydro dynamic bearing device 1 while drastically decreasing the possibility of occurrence of lubricating oil leakage during the operation of the hydro dynamic bearing device 1. In this embodiment, the oil-level height detector 65 can detect an oil-level height using a single laser displacement meter 66. However, a plurality of laser displacement meters 66 can be used for oil-level detection. In this embodiment, the oil-level height is determined at two circumferential positions around the axial center Z. Instead, the oil-level height may be determined at one position or three or more positions. In this embodiment, the oil-level height detection using laser beams is performed after adjusting the amount of lubricating oil in the housing 7 by sucking the oil under a negative pressure as described above. However, the oil adjusting methods other than this may be adopted, such as sucking oil without using a negative pressure and wiping off oil.

After performing each of the above steps, the finishing treatment including a subsequent step of removing the adhering oil (e.g., a wiping-off treatment using the apparatus shown in FIG. 4 and described above) is performed to provide a completed product of the hydro dynamic bearing device 1. The hydro dynamic bearing device 1 obtained as a completed product is used as one of structural components of a motor as described below.

Figure 9:
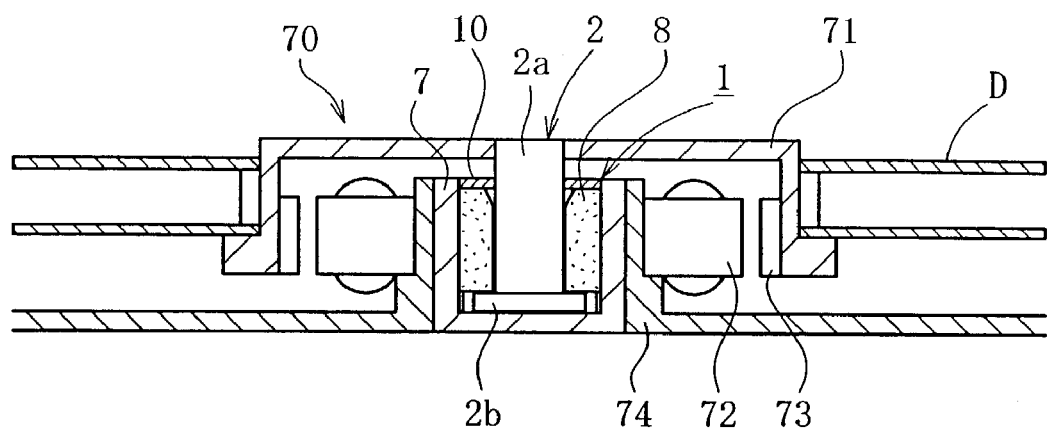
FIG. 9 is a schematic vertical cross-sectional front view showing a state in which the hydro dynamic bearing device manufactured by the manufacturing method and the apparatus in accordance with one of the embodiments of the present invention is incorporated in a spindle motor.

That is, a spindle motor 70 for an information technology device as illustrated in FIG. 9 is used in a disk driving device such as a hard disk drive (HDD). The spindle motor 70 includes a disk hub 71 mounted on the axial member 2 of the above hydro dynamic bearing device 1, and a motor stator 72 and a motor rotor 73 facing to each other through a clearance in the radial direction or the like. The stator 72 is installed on the outer periphery of a casing 74 and the rotor 73 is installed on the inner periphery of the disk hub 71. The housing 7 of the hydro dynamic bearing device 1 is attached on the inner periphery of the casing 74. In the disk hub 71, one or more magnetic disks or the like are held. Then, by energizing the stator 72, an excitation force generated between the stator 72 and the rotor 73 rotates the rotor 73, thereby rotating the disk hub 71 and the axial member 2 together.

Then, accompanying the rotation of the disk hub 71, even though the temperature of the hydro dynamic bearing device 1 increases to a temperature near the upper limit temperature of the operation, the leakage of the lubricating oil filled in the housing 7 from the sealing space S to the outside can be properly avoided. Therefore, it becomes possible to effectively prevent the functional defective of the motor 70 caused by the leakage of the lubricating oil and also effectively prevent the disk D from being suffered from undesired influences thereof, and so on.

In all of the embodiments described above, the present invention is applied to the hydro dynamic bearing device of the type that the sealing space is formed between the sealing member and the axial member. However, the present invention is not limited thereto, and just as with the above embodiments, the present invention may be applied to a hydro dynamic bearing device of the type that the sealing member is formed so as to cover the region extending from the whole area on the upper end side of the housing to the outer peripheral side of the upper end part in a state where the sealing member is integrally fixed on the axial member, and the sealing space is formed between the outer peripheral surface of the upper end part of the housing and the inner peripheral surface of the sealing member, which are faced to each other.

In addition, in all of the embodiments described above, the present invention is applied to the hydro dynamic bearing device where the axial member having the flange part is used and the hydro dynamic pressure generating groove of the thrust bearing part is formed on both end faces of the flange part or the surfaces facing to these end faces. However, the present invention is not limited thereto, and just as with the above embodiments, the present invention may also be applied to a hydro dynamic bearing device which is constructed such that an axial member having no flange part is used and the end face of the axial member is held by the thrust plate attached on the bottom surface of the housing without forming the hydro dynamic pressure generating groove in the bearing surface as a thrust bearing part.

Furthermore, in all of the above embodiments, the present invention is applied to the hydro dynamic bearing device constructed of the housing and the sealing member which are separately mounted. However, the present invention is not limited thereto, and just as with the above embodiments, the present invention may also be applied to a hydro dynamic bearing drive constructed of the housing and the sealing member (the sealing part) which are integrally formed together.

Furthermore, in all of the above embodiments, the present invention is applied to the hydro dynamic bearing device constructed of the housing, the bearing member, and the sealing member which are separately mounted. However, the present invention is not limited thereto, and just as with the above embodiments, the present invention may also be applied to a hydro dynamic bearing drive constructed of the three structural components which are integrally formed together.

As described above, according to the method and the apparatus for manufacturing the hydro dynamic bearing device of the present invention, the lubricating oil adhering at least to the outer bottom surface and the outer peripheral surface of the housing is blown off or streamed with blowing by blowing the gas on these surfaces at the time of wiping off the lubricating oil adhering to the device in a subsequent step after applying the lubricating oil to the unlubricated hydro dynamic bearing device. Therefore, there is no need of conducting any difficult or complicated work required for the wiping off with a resin film, which has been required in the conventional method. Therefore, it becomes possible to improve the working efficiency to a large extent. In addition, even though a recessed part or a stepped part is formed in the housing, the lubricating oil that tends to be remained in the recessed or stepped part can easily be wiped off by the gas, so that it becomes possible to obtain a high-quality hydro dynamic bearing device.

In this case, a gas-flowing passage may be formed such that a gas from the single gas-blowing means flows along the outer bottom surface and the outer peripheral surface of the housing. Consequently, only by providing the single gas-blowing means, the lubricating oil adhering to both the above surfaces of the housing can be wiped off all at once by the gas. Therefore, the configuration of the apparatus described above can reduce the number of structural parts of the device to be used for the wiping-off operation, can achieve the miniaturization of the device, and also reduce the cost of the device, while contributing a reduction in the manufacturing costs.

Furthermore, the area extending from the outer end face of the sealing part to the axial member is shielded from the gas-flowing passage when the hydro dynamic bearing device is held such that the sealing part is located below. Therefore, even though the lubricating oil flows downward on the gas-flowing passage along the housing, there is no possibility of causing trouble in which the lubricating oil flows and adheres to the outer end face of the sealing part or to the axial member, or the lubricating oil flows into a sealing space between the sealing part and the axial member.

According to the method and the apparatus for manufacturing the hydro dynamic bearing device, the lubricating oil adhering at least to the outer end face of the sealing part and the outer end face of the axial member is wiped off by sucking the oil with the action of the negative-pressure suction force caused by the suction means at the time of wiping off the lubricating oil adhering to the hydro dynamic bearing device in a subsequent step of applying the lubricating oil to the unlubricated hydro dynamic bearing device. There is no need of difficult and complicated work of wiping off the lubricating oil using a resin film or the like. Thus, it becomes possible to improve the working efficiency to a large extent. In addition, even though the axial member protrudes from the sealing part outside, the procedure based on negative-pressure suction substantially prevent the axial member from standing in the way of wiping off the lubricating oil. Therefore, the wiping can be performed appropriately without improperly remaining the undesired lubricating oil on a part where it is difficult to wipe the lubricating oil due to the presence of the axial member.

In this case, when the suction means is constructed of two suction nozzles respectively corresponding to the outer end face of the sealing part and the outer end face of the axial member, the amount of the lubricating oil being sucked can be stably adjusted and also easily managed by managing the nozzle diameter, nozzle-tip position, and sucking force of each suction nozzle. Furthermore, the nozzle tip can be easily close to a part where it is difficult to wipe off the lubricating oil due to the presence of the axial member. Therefore, the wiping-off operation can be more appropriately performed.

Furthermore, when the lubricating oil is sucked and wiped off by the suction means while rotating the hydro dynamic bearing device about the axial center, the suction means is only held on a fixed position or a simple reciprocating motion such as a swing motion of the suction means is only required. This contributes a simplification of the mechanism for moving the suction means and also contributes a simplification of the device required for the wiping-off operation and a cost reduction in providing such a device.

In addition, according to the method and the apparatus for manufacturing the hydro dynamic bearing device, the lubricating oil is sucked from the sealing space of the sealing part or the vicinity thereof using the suction means that generates a negative-pressure suction force at the time of adjusting the amount of oil in the housing after applying the lubricating oil to the unlubricated hydro dynamic bearing device. Therefore, the control of the suction force and also the control of the suction oil amount can be performed stably, compared with the conventional method that uses a naturally-absorbing action with a cotton swab or the like. Consequently, it becomes possible to easily control the oil-level height and the amount of the oil in the housing without variation, so that problems of early deterioration of the bearing device due to a leakage of the lubricating oil to the outside and poor lubrication at the time of driving the hydro dynamic bearing device at an upper limit temperature of the operation can be effectively avoided.

Furthermore, at the time of adjusting the amount of oil, the oil-level height may be measured by a laser after sucking the lubricating oil. Consequently, a high-quality hydro dynamic bearing device can be provided in the market since the selection between the good product and the defective product can be performed by confirming whether the suction oil amount of the lubricating oil by the suction means is correct using a laser.

Furthermore, according to the method and the apparatus for manufacturing the hydro dynamic bearing device of the present invention, there is provided the suction means that adjusts the oil-level height of the lubricating oil in the housing by sucking the lubricating oil from the sealing space of the sealing part or the vicinity thereof under a negative pressure. Therefore, it becomes possible to precisely and easily manage the oil-level height and the amount of the lubricating oil. Problems of early deterioration of the bearing device due to a leakage of the lubricating oil to the outside and poor lubrication at the time of driving the hydro dynamic bearing device at an upper limit temperature of the operation can be effectively avoided.

Furthermore, since the suction means includes a suction nozzle, the nozzle diameter, nozzle-tip position, suction force, and suction time of the suction nozzle can be managed to adjust the oil-level height in a stable manner and to manage such an adjustment in a simple manner. Therefore, Problems of early deterioration of the bearing device due to a leakage of the lubricating oil to the outside and poor lubrication at the time of driving the hydro dynamic bearing device at an upper limit temperature of the operation can be avoided more effectively.

Furthermore, the suction means is capable of being close to or being away from the sealing space in a relative manner. Consequently, it becomes possible to place the suction means on the sealing space or the vicinity thereof when the amount of lubricating oil in the housing should be adjusted. Also it is possible to relatively displace the suction means away from the sealing space when the adjustment of the amount of oil is not performed. Thus, for example, it becomes possible to make the fabrication procedure automatic and also to speedup the procedure when the hydro dynamic bearing device is produced on an assembly line.

Furthermore, the rotation jig for rotating the hydro dynamic bearing device about an axial center is equipped in the apparatus. According to such a configuration of the apparatus, it becomes possible to suck the lubricating oil by the suction means while rotating the hydro dynamic bearing device about the axial center by the rotation jig. As the suction means is allowed to suck the lubricating oil directly over the entire perimeter of the sealing space, the amount of the lubricating oil can be adjusted more precisely and uniformly.

In addition, a laser for measuring the oil-level height of the lubricating oil after sucking the oil is provided. In this case, a high-quality hydro dynamic bearing device can be provided in the market since the selection between the good product and the defective product can be performed by confirming whether the suction oil amount of the lubricating oil by the suction means is correct using a laser.

Furthermore, according to the method and apparatus for manufacturing the hydro dynamic bearing device of the present invention, the oil-level height of the lubricating oil in the housing can be detected by a laser (laser displacement determining means). Consequently, after lubricating the hydro dynamic bearing device during the manufacturing process, whether the oil amount filled in the housing is proper or not can be confirmed by means of a laser (laser beam). It is possible to detect whether the oil amount is insufficient or excess with accuracy in comparison with the prior art. Further, it contributes to automation of the oil-level height detection.

What is claimed is:

1. A method for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing, the method comprising the step of:

sucking the lubricating oil from a sealing space of the sealing part or a vicinity thereof by suction means for generating a negative-pressure suction force to adjust an oil-level height of the lubricating oil in the housing so that the oil-level is set in the sealing space, wherein the oil-level height is measured by means of a laser after sucking the lubricating oil.

2. An apparatus for manufacturing a hydro dynamic bearing device including a housing, an axial member housed in the housing, a radial bearing part for supporting the axial member in a non-contact manner in a radial direction by a hydra dynamic pressure action of a lubricating oil generated in a radial bearing clearance, and a sealing part formed on one end part of the housing, the apparatus comprising suction means for sucking the lubricating oil from a sealing space of the sealing part or a vicinity thereof under a negative pressure to adjust an oil-level height of the lubricating oil in the housing, and laser displacement determining means for measuring the oil-level height of the lubricating oil after sucking the lubricating oil.

3. The apparatus for manufacturing a hydro dynamic bearing device according to claim 2, wherein the suction means comprises a suction nozzle.

4. The apparatus for manufacturing a hydro dynamic bearing device according to claim 2, wherein the suction means is capable of being close to or being away from the sealing space in a relative manner.

5. The apparatus for manufacturing a hydro dynamic bearing device according to claim 2, further comprising a rotation jig for rotating the hydro dynamic bearing device about an axial center.

6. A method for manufacturing a hydro dynamic bearing device including a housing, an axial member housed in the housing, a radial bearing part for supporting the axial member in a non-contact manner in a radial direction by a hydro dynamic pressure action of a lubricating oil generated in a radial bearing clearance, and a sealing part formed on one end part of the housing, the method comprising the step of:

sucking the lubricating oil from a sealing space of the sealing part or a vicinity thereof by suction means for generating a negative-pressure suction force to adjust an oil-level height of the lubricating oil in the housing so that the oil-level is set in the sealing space, wherein the sucking of the lubricating oil is performed in a closed space surrounding the seal space and outer circumferential of the axial member.

* * * * *